July 9, 1963 I. J. P. JAMES 3,097,260

CORRECTION OF TRANSMISSION VARIATIONS IN TELEVISION STANDARDS CONVERTING SYSTEM

Filed Nov. 8, 1956

Inventor
I. J. P. James
By Glascock Downing & Seebold
Attys.

United States Patent Office 3,097,260
Patented July 9, 1963

3,097,260

CORRECTION OF TRANSMISSION VARIATIONS IN TELEVISION STANDARDS CONVERTING SYSTEM

Ivanhoe John Penfound James, South Ealing, London, England, assignor to Electric & Musical Industries Limited, Hayes, England, a company of Great Britain Filed Nov. 8, 1956, Ser. No. 621,103
Claims priority, application Great Britain Nov. 12, 1955
4 Claims. (Cl. 178—5.4)

This invention relates to correction of transmission variations in television signal transmission systems.

In colour television systems, it has been proposed to employ a so-called chromacoder to convert frame-sequential signals to simultaneous signals. However, in such a converter sensitivity or storage variations of photo-electrically sensitive surfaces, such as employed in pick-up tubes, and variations of light emission by cathode ray tubes, cause variations in the outputs from those surfaces as they are scanned which in turn disturb the balance between the different colour component signals resulting in bad colour representation in the final picture of the original object. Such difficulty may also arise from optical sensitivity variations in the converter. Such variations, occurring singly or in combination, are referred to generally hereinafter as transmission variations.

The object of the present invention is to reduce these difficulties.

According to the present invention there is provided a television signal transmission system comprising converting means for converting applied television signals having one scanning standard into television signals having another scanning standard, means for applying television signals to said converting means during spaced intervals to derive corresponding converted signals, means for applying a reference signal to said converting means during intervening intervals to derive a corresponding signal constituting a correcting signal, storage means for said correcting signal, and means responsive to a correcting signal derived from said storage means during said first mentioned intervals to reduce the effect of transmission variations of said converting means on television signals derived therefrom.

Figure 1:
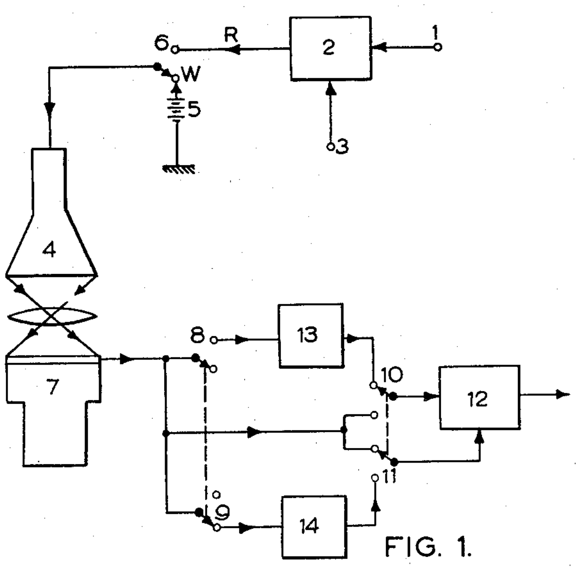
Figure 2:
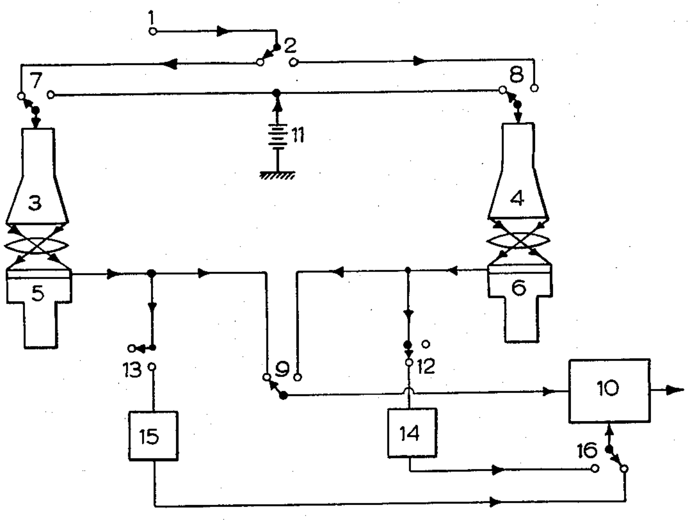

In order that the invention may be clearly understood and readily carried into effect, it will be described with reference to the accompanying drawings, in which:

FIGURE 1 illustrates one example of a colour television system converter according to the present invention, and FIGURE 2 illustrates a further example of the same according to the present invention.

It will be assumed that the invention is applied to a colour television transmission system including a camera for generating field-sequential colour television signals, the signals consisting of a sequence of fields R, G, B, R, G, B with alternate fields interlaced, the complete sequence of six fields being repeated every $\frac{1}{25}$ of a second, where R, G and B represent a red, green and blue signal, respectively, for one field. The field-sequential signals are applied to a so-called chromacoder in which these signals are displayed on three different cathode ray tubes, one of each colour component, which displays are exposed to three pick-up tubes, the photo-electrically sensitive surfaces of which are scanned at a different rate from that of the cathode ray tubes. Thus the red signal is normally gated to the red channel in a sequence R, —, —, R, —, —, where each dash denotes a field period of the field sequential signals during which the gate to the red channel is closed and the red signal when converted is of the form R, R, two fields of $\frac{1}{60}$ of a second each with transmission variations superimposed. The derived signal R, R, thus comprises two television fields corresponding to the applied signal but with different scanning standards. In one example according to the present invention alternate R fields of the applied signals are suppressed and replaced by a reference signal denoted by W so that the gate is arranged to apply R, —, —, W, —, — to the red cathode ray tube, where W represents an unmodulated raster produced by a reference signal of constant amplitude, representing peak white, say. The converted signal is then R, W where R and W have variations in transmission superimposed on them. Two delay systems are provided, each having a delay of one field period of the converted signal ($\frac{1}{50}$ of a second) such that the W signal is gated out and is replaced by a delayed R signal, so that the signal transmitted is R, R. The interlaced scan is suppressed in the transmitted signal so that the picture has effectively half the normal number of lines but for a colour component this can be effected without undue loss of definition. The other delay system is used to delay the W signal, the W, W signal thus formed being used to control directly dynamic gain controlled amplifiers in the output circuit of the channel.

This first example is illustrated by FIGURE 1 in which field sequential signals form the input at 1 to a gate 2 which under the control of synchronising pulses at 3 admits only the red component signals. Alternate frames of the red signals R are displayed on the screen of a cathode ray tube 4, and during the intervening red frame intervals of the applied signals a constant signal W derived from a source of constant potential shown as a battery 5 is displayed, the control of the input to tube 4 being by switch 6. The display on the screen of cathode ray tube 4 energises the mosaic of pick-up tube 7, which is scanned at the rate of 50 fields a second. If the output from the pick-up tube 7 is a red signal then switches 8, 9, 10 and 11 will be in the alternate positions to those shown, so that the output passes directly through switch 10 to a dynamic gain control amplifier 12 and at the same time to signal store 13 via switch 8. When the switches change to the positions shown, the output from tube 7 is that produced by the signal W, which passes through switch 11 to control the gain of amplifier 12 which is receiving its signal input from signal store 13, which contains a record of the preceding red signal. The signal W is at the same time stored in correction signal store 14 so that when the following red signal forms the output of tube 7 the correction signal stored in store 14 can be applied to control the gain of amplifier 12.

A disadvantage of this example is that the bandwidth of the store 13 for the red field has to be adequate for 1.5 mc./s. whereas the correction signal store 14 need only be adequate for approximately 0.25 mc./s., or less. Also, the derived signals are only representative of alternate red fields.

These disadvantages are overcome by the example illustrated in FIGURE 2 in which the correction signals W only are stored. The red signals are gated, as above, to the input 1 by a gate not shown and pass through switch 2 to one of two cathode ray tubes 3 and 4, via switch 7 or 8. With the switches in the positions shown, the red signal R is displayed on cathode ray tube 3 which produces an output from pick-up tube 5 as above, this output passing through switch 9 to dynamic gain control amplifier 10. Meanwhile a constant signal is fed to cathode ray tube 4 from source 11, the resultant output W from pick-up tube 6 passing via switch 12 to store 14 which stored signal W is employed to control directly the gain of amplifier 10 when the switches are in their alternate positions and the red signal input to amplifier 10 is derived from pick-up tube 6. At this latter stage a correction signal is derived from pick-up tube 5 for store 15 via switch 13. Thus the W signal is delayed in a store for the duration of one field so that it is used to correct the corresponding R signal that is being transmitted.

In the above examples, the switches are of electronic form and are controlled by synchronising pulses, also the storage devices must have means for erasing a recorded signal after, or whilst, it is being used.

The signal W has been described as occupying one field period of the field sequential signals. However, it may be of any desired period, such as (for the case of a systems converter) the intervals between alternate R fields of the field sequential signals at one extreme, or the return period of the field sequential rate in the other extreme, because of the storage action of the pick-up tube. These proposals will involve modifying the scanning rate of the display tube, or tubes, between displaying the colour signals, for example the alternate red signal fields and displaying the W signal.

The stores employed in the present invention may be of magnetic drum type, a storage tube type such as described, for example, in United States Patent Number 2,721,228 or a Tonotron as described in the Proceedings of the I.R.E., September 1956, p. 81A. Other suitable types of stores may be employed equally well.

The gain control amplifier is shown in the output stages of both examples but this is not essential and the amplifier may be elsewhere, for example in the red signal input line at 1. If the gain control amplifier is in the red signal input line, the scanning standards of the correcting signal as applied to the gain control amplifier must correspond to those of the applied red signals. This can be achieved for example by changing the field scanning rate of the pick-up tube 7 when the W signal is being derived.

Also the conversion apparatus described above employs a combination of cathode ray tubes and pick-up tubes, whereas a "reading-writing" type of tube may be readily employed.

In some cases for translating field-sequential television signals, it may be considered unsuitable to correct the green signal G (or luminance signal, say, as the case may be) due to the resultant noise caused by so doing. Thus the red and blue signals, R and B (or the X and Z or other primary signals), may have the transmission variations of the green (or luminance) channel superimposed on them to maintain a correct colour balance at the expense of errors in luminance. This may be achieved by modifying the dynamic gain control amplifiers in the red and blue (or X and Z) channels in proportion to a correcting signal derived from the green or luminance channel in the above manner or by applying the W signal from the green or luminance channel as the reference stimulus for the red and blue (or X and Z) channels. This principle is described in British patent application Number 36,090/55. Where the reference stimulus is the W signal from the luminance channel, it must have scanning standards compatible with those employed in the display tube 4.

The invention is described above, by way of example, with reference to colour television, but it is not limited to such apparatus and may be applied elsewhere, for example to monochrome systems converters.

What I claim is:

1. A television signal transmission system comprising converting means for converting applied television signals having one scanning standard into television signals having another scanning standard, means for applying television signals to said converting means during spaced intervals to derive corresponding converted signals, means for applying a reference signal to said converting means during intervening intervals to derive a corresponding signal constituting a correcting signal, storage means for said correcting signal, and means responsive to a correcting signal derived from said storage means during said first mentioned intervals to reduce the effect of transmission variations of said converting means on television signals derived therefrom.

2. A system according to claim 1 comprising other storage means for storing television signals derived from said converting means, means for deriving television signals from said storage means during said intervening intervals, and means responsive to the correcting signal derived from said converting means to reduce the effect of transmission variations of said converting means of television signals derived from said other storage means.

3. A system according to claim 1, comprising other converting means for converting applied television signals having said one scanning standard into television signals having said different scanning standard, means for applying television signals to said other converting means during said intervening intervals to derive corresponding converted signals, means for applying a reference signal to said other converting means during said first mentioned intervals to derive a corresponding signal, constituting another correcting signal, other storage means for said other correcting signals, means responsive to a correcting signal derived from said other storage means during said intervening intervals to reduce the effect of transmission variations of said other converting means on television signals derived therefrom, and means for applying television signals derived from said first mentioned and other converting means to a single channel.

4. A system according to claim 1, said converting means comprising a cathode ray display tube for producing a light image corresponding to applied television signals, and a pick-up tube for deriving television signals corresponding to said light image, and said means for applying a reference signal comprising means for applying a signal of constant amplitude to said display tube.

References Cited in the file of this patent

UNITED STATES PATENTS

| | | |
|---|---|---|
| 2,545,957 | Kell | Apr. 20, 1951 |
| 2,587,005 | Smith | Feb. 26, 1952 |
| 2,587,006 | Smith | Feb. 26, 1952 |
| 2,733,292 | Cope | Jan. 31, 1956 |